(12) United States Patent
Suzuki et al.

(10) Patent No.: US 7,747,056 B2
(45) Date of Patent: Jun. 29, 2010

(54) IMAGE DATA AREA EXTRACTING SYSTEM AND IMAGE DATA AREA EXTRACTING METHOD

(75) Inventors: Kaoru Suzuki, Tochigi-ken (JP); Jeffrey Hall, Tokyo (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 1057 days.

(21) Appl. No.: 11/218,594

(22) Filed: Sep. 6, 2005

(65) Prior Publication Data

US 2006/0050963 A1 Mar. 9, 2006

(30) Foreign Application Priority Data

Sep. 6, 2004 (JP) ............................. 2004-258829

(51) Int. Cl.
*G06K 9/00* (2006.01)
(52) U.S. Cl. ....................................... 382/131; 382/173
(58) Field of Classification Search ................. 382/131, 382/173
See application file for complete search history.

(56) References Cited

U.S. PATENT DOCUMENTS 5,832,134 A * 11/1998 Avinash et al. .............. 382/257
6,463,168 B1 * 10/2002 Alyassin et al. ............. 382/131
7,386,153 B2 * 6/2008 Kim ............................ 382/128

FOREIGN PATENT DOCUMENTS

| JP | 5-130989 | 5/1993 |
| WO | WO 03/043490 A1 * | 5/2003 |

* cited by examiner

*Primary Examiner*—Vikkram Bali
*Assistant Examiner*—Katrina Fujita
(74) *Attorney, Agent, or Firm*—Oblon, Spivak, McClelland, Maier & Neustadt, L.L.P.

(57) ABSTRACT

An image data area extracting system includes: a threshold value setting unit configured to set a threshold value for three dimensional image data of an object; an area managing unit configured to extract a threshold value area from the three dimensional image data based at least in part on the threshold value; a three dimensional projection image display unit configured to display an image, the image being constructed from the three dimensional image data; a starting point designating unit configured to designate a starting point for a connected area to be deleted from the image; and an extract connected area deleting unit configured to remove the connected area from the image.

23 Claims, 7 Drawing Sheets

IMAGE DATA AREA EXTRACTING SYSTEM AND IMAGE DATA AREA EXTRACTING METHOD

CROSS REFERENCE TO RELATED APPLICATIONS

This application claims the benefit of priority from Japanese Patent Application No. 2004-258829, filed Sep. 6, 2004, the contents of which are incorporated herein by reference in their entirety.

BACKGROUND OF THE INVENTION

1. Field of the Invention

The present invention relates to an image data area extracting system and an image data area extracting method applicable to image diagnosis devices. Particularly, the present invention is directed to an image data area extracting system and an image data area extracting method for removing areas that are unnecessary for diagnosis in a medical image.

2. Discussion of the Background

Generally, an image diagnosis apparatus, such as an X-ray computed tomography (CT) device, is used to acquire and reconstruct X-ray CT image data by detecting X-rays penetrated through an object. In particular, to observe blood vessels, imaging is performed by injecting a contrast medium into an object and X-ray CT image data of the contrasted blood vessels is then reconstructed. Namely, three-dimensional (3D) projection image data is constructed using the reconstructed X-ray CT image data.

Usually, a Maximum Intensity Projection (MIP) method, a minimum intensity projection method (MinIP), or an X-ray projection method is used for reconstructing the 3D projection image data. To observe the contrasted blood vessels, 3D projection images are generally constructed using the MIP method. The resultant image is known as an MIP image.

While an MIP image is useful to observe blood vessels, it has several limitations. More particularly, images of other physical structures, such as bones, are reconstructed with the blood vessel data because a CT value for a contrasted blood vessel and a CT value for a bone are close. As a result of the presence of the bone tissue images in the MIP images, accurate diagnosis of blood vessels is inhibited.

To resolve this difficulty, another method has been proposed, for example, as described in Japanese Patent Application Publication No. 9-73557. According to this method, 3D images of surface rendering (SR) images using voxel or volume rendering (VR) images are reconstructed. Additionally, data related to unnecessary bone areas is deleted through the SR images or the VR images prior to observation of the contrasted blood vessels.

FIGS. 1(a)-1(c) illustrate the method for deleting unnecessary bone area prior to observation of the contrasted blood vessels. FIG. 1(a) illustrates a shaded volume rendering (SVR) image produced using the MIP method. Because the CT value of bone is generally equal to the CT value of a blood vessel in the conventional method, both blood vessels and bones appear in the SVR image as shown in FIG. 1(a).

To discriminate between bone and blood vessels in an SVR image, a threshold value using CT value and opacity for a CT value are set. The image is displayed by discriminating between bone and contrasted blood vessels using the threshold and opacity. It is also possible to delete bone area image data selectively by dividing or by extracting SVR image data of bone area using a connected area extracting method.

FIG. 1(b) shows an SVR image of a contrasted blood vessel from which bone area image data has been deleted. The MIP image is produced from X-ray CT image data included in the blood vessel area of the SVR image.

However, these observations of contrasted blood vessels using an X-ray CT apparatus cannot efficiently perform the deletion of bone area image data because many soft tissues present in the same area have CT values substantially equal to CT values for bones. For example, other tissues (e.g., cartilage or other organs) may interfere with the removal of bone area image data.

Because the CT value of bone ranges to a certain extent, if a threshold value and opacity are set at a low CT value at the start of bone area image data deletion operation, organs (which are a type of soft tissue) are also displayed with bones. Since soft tissues (e.g., internal organs) include large contact areas with the contrasted blood vessels, it is difficult to extract the bone area image data. Thus, if CT values of the threshold value and the opacity are set low, it is difficult to efficiently delete the bone area image data.

An alternative approach is to set the CT value of the threshold and opacity high. While the bone area image data is deleted by setting the threshold value at high CT to construct the MIP images from the X-ray CT image data, as depicted in the circled ranges of 1(c), soft tissue (e.g., cartilage) remains in the images, since the CT value of cartilage is substantially similar to the CT value of bones.

It is possible construct an MIP image by selectively deleting cartilage based on setting a new threshold value with the connected area extracting method. By doing this, it is possible to delete the bone area image data that remains in the MIP image in FIG. 1(c). However, even in this reconstructed MIP image, cartilage having lower CT values remains. Consequently, to obtain an MIP image effective for diagnosis, it is necessary to repeat complex processes to delete the bone area image data using the 3D image, a confirmation of the MIP images, and successive setting of threshold values for deletion.

While the above examples have illustrated the difficulties for diagnosing blood vessels, the same difficulties also apply to observation of other organs. Additionally, the data used for processing in the above-identified application may be obtained from a local memory, a remote memory, or a storage device via a communication network, such as in a PACS system.

SUMMARY OF THE INVENTION

The present invention addresses the above-identified problems of the conventional methods and provides an improved image area extracting system and an image data area extracting method. Through the present invention, it is possible to easily extract unnecessary areas from X-ray CT image data in accordance with a CT value and to produce three-dimensional projection image data at the internal and external ranges of the extracted area.

To this end, one aspect of the present invention provides an image data area extracting system, including: a threshold value setting unit configured to set a threshold value for three dimensional image data of an object, the three dimensional image data being derived from an image diagnosis apparatus; an area managing unit configured to set an existing area of the three dimensional image data and to extract a threshold value area of the three dimensional image data in the existing area based on the threshold value; a three dimensional projection image display unit configured to display a three dimensional projection image by providing three dimensional projection image data to an image display unit, the three dimensional projection image data being constructed from the three dimensional image data included in the existing area; a starting point designating unit configured to designate a starting point for a connected area to be deleted from the three dimensional projection image displayed on the image display unit or to designate a starting point for a connected area being displayed on the image display unit, based on operation data from an input unit through the three dimensional projection image and the threshold value area; a connected area extraction unit configured to acquire the threshold value area that connects to the designated starting point as the connected area; and an extracted connected area deleting unit configured to renew the existing area by excluding the connected area.

Another non-limiting aspect of the present invention provides an image data area extracting method, including: setting a threshold value for three dimensional image data of an object, the three dimensional image data being derived from an image diagnosis apparatus; setting an existing area of the three dimensional image data and extracting a threshold value area of the three dimensional image data in the existing area, based at least in part on the threshold value; constructing a three dimensional projection image from the three dimensional image data included in the existing area; displaying the three dimensional projection image on an image display unit; designating a starting point for a connected area to be deleted from the displayed three dimensional projection image or a starting point for a connected area to be displayed, based on input operation data through the three dimensional projection image and the threshold value area; and renewing the existing area to exclude the connected area.

Yet another non-limiting aspect of the present invention includes an X-ray CT apparatus including: a data collecting unit configured to collect raw data of an object; an image reconstructing unit configured to reconstruct three dimensional image data from the collected raw data; a threshold value setting unit configured to set a threshold value of the three dimensional image data; an area managing unit configured to manage an existing area of the three dimensional image data and to extract the threshold value area of the three dimensional image data at the existing area based at least in part on the threshold value; a three dimensional projection image displaying unit configured to display three dimensional projection image data from the three dimensional image data included in the existing area; an area extraction starting point designating unit configured to designate the starting point of a connected area to be deleted from the three dimensional projection image data according to an inputted location data designated on the three dimensional projection image data and the threshold value area; a connected area extracting unit configured to extract the threshold value area connected to the starting point designated as the connected area; and an extract connection area deleting unit configured to delete the connected area and to input renewal data to the area managing unit, the renewal data including the existing area data without the connected area data.

Another aspect of the present invention provides an image data area extracting system, including: a threshold value setting unit configured to set a threshold value for three dimensional image data of an object; an area managing unit configured to extract a threshold value area from the three dimensional image data based at least in part on the threshold value; a three dimensional projection image display unit configured to display an image, the image being constructed from the three dimensional image data; a starting point designating unit configured to designate a starting point for a connected area to be deleted from the image; and an extract connected area deleting unit configured to remove the connected area from the image based at least in part on the threshold value.

The present invention further includes an image data area extracting method, including: setting at least one threshold value for three dimensional image data of an object; isolating at least one existing area in the three dimensional image data; extracting at least one threshold value area from the existing area based at least in part on the at least one threshold value; constructing a three dimensional projection image from the three dimensional image data; displaying the three dimensional projection image on an image display unit; and deleting at least one connected area adjacent to the threshold value existing area.

Additionally, the present invention provides, as a non-limiting aspect, an X-ray CT apparatus including: a data collecting unit configured to collect raw data related to an object; an image reconstructing unit configured to reconstruct three dimensional image data from the raw data; a threshold value setting unit configured to set a threshold value for the three dimensional image data; an area managing unit configured to determine a threshold value area of the three dimensional data based on the threshold and to extract the threshold value area, thereby generating remaining three dimensional data; a display unit configured to display projection image data generated using the remaining three dimensional data; a connected area extraction unit configured to extract a connected area connected to the threshold value area; and a deleting unit configured to delete the connected area, wherein the display unit is further configured to display projection image data using data remaining after the connected area is deleted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
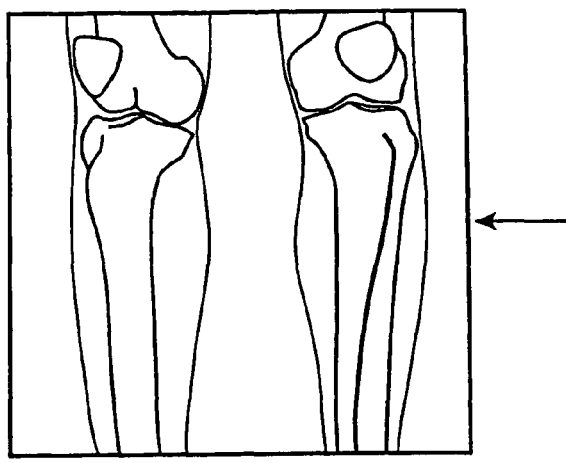
FIGS. 1(a)-1(c) explain processes for observation using an MIP image, including deleting bone area image data prior to performing a contrasted blood vessel observation.
Figure 1B:
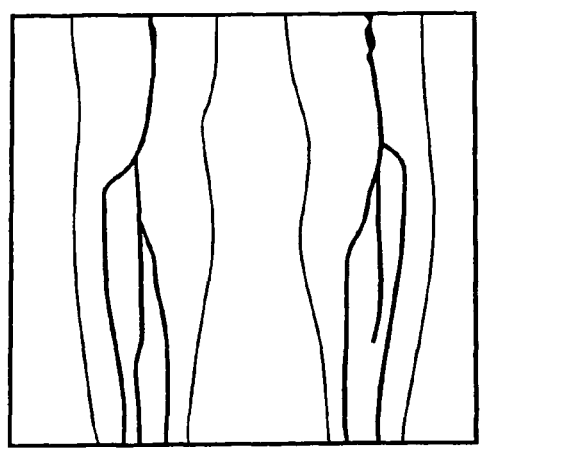
Figure 1C:
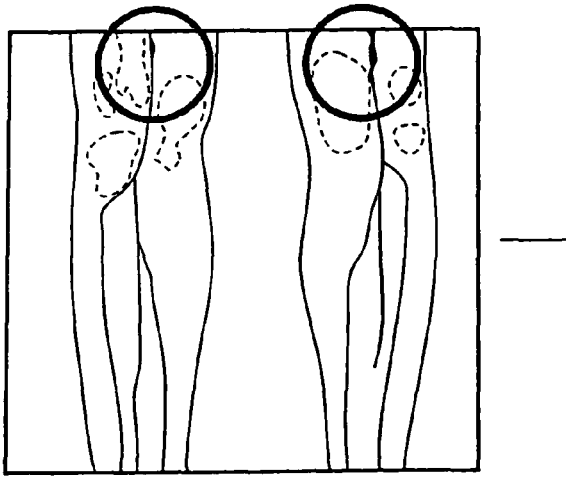

Referring now to the drawings, wherein like reference numerals designate identical or corresponding parts throughout the several views, while the present invention is applicable to image processing devices, such as an MRI apparatus or an ultrasound diagnosis apparatus, as non-limiting examples, the following explanation uses an X-ray CT apparatus as an illustrative feature.

Figure 2:
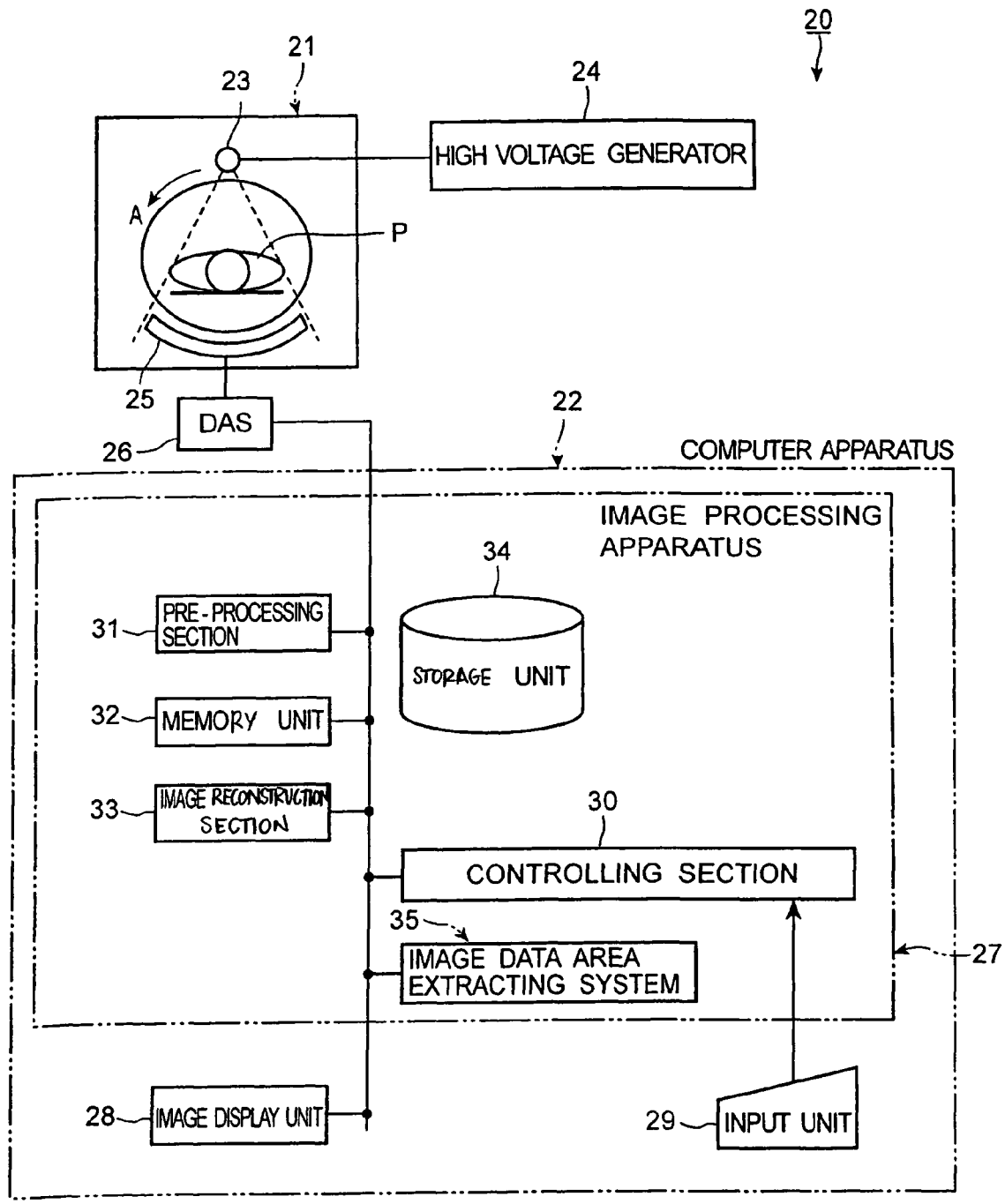
FIG. 2 is a block diagram illustrating a non-limiting embodiment of an image data area extracting system according to a non-limiting aspect of the present invention, in which an X-ray CT apparatus acquires image data.

FIG. 2 is a block diagram illustrating the image data area extracting system as applied to an X-ray CT apparatus 20. The X-ray CT apparatus 20 includes a gantry 21 and a computer apparatus 22. The gantry 21 is provided with an X-ray tube 23, a high voltage generator 24, an X-ray detector 25, and a data acquisition system (DAS) 26. The X-ray tube 23 and the X-ray detector 25 are mounted at positions facing each other with an object P positioned therebetween. The object P may be positioned on a surface (e.g., a patient table) positioned in the turning ring, which may rotate at a high speed continuously in direction A. The rotating feature of the turning ring is not illustrated in FIG. 2.

The high voltage generator 24 supplies a tube current and a tube voltage to the X-ray tube 23 according to the control signals from the computer apparatus 22. The X-ray detector 25 detects the X-ray as transmitted through the object P. The X-ray signals detected by the X-ray detector 25 are then digitized as the data acquisition system 26 and are inputted into the computer apparatus 22 as raw data. In other words, the X-ray CT apparatus 20 functions as a raw data acquisition means, to acquire the raw data from the object P.

The computer apparatus 22 may include an image processing apparatus 27, an image display unit 28, and an input unit 29. The image processing apparatus 27 may include a pre-processing section 31, which converts the raw data outputted by the data acquisition system 26 into projection data through a correcting process; a memory unit 32, which stores the projection data; an image reconstruction section 33, which reconstructs 3D image data from the projection data; a storage unit 34 which temporally stores the 3D image data prepared by the image processing apparatus 27 and the raw data outputted by the data acquisition system 26; and an image data area extracting system 35, which produces 3D image data of a specific area by reading out the 3D image data from the storage unit 34. The controlling section 30 may centralize operations of all of these aspects of the computer apparatus 22. In other words, the X-ray CT apparatus may be configured to perform image reconstruction. The X-ray CT apparatus may reconstruct 3D image data from the raw data using preprocessing section 31 and an image reconstruction section 33 of image processing apparatus 27.

The data area extracting system 35 may be provided outside the image processing apparatus 27. In other words, the data area extracting system 35 may be provided external to or independently of the X-ray CT apparatus 20. When the image data area extracting system 35 is provided independently from the X-ray CT apparatus 20, it is preferable that this system is composed such that image data taken by the X-ray CT apparatus 20 may be inputted into an external image data area extracting system.

Figure 3:
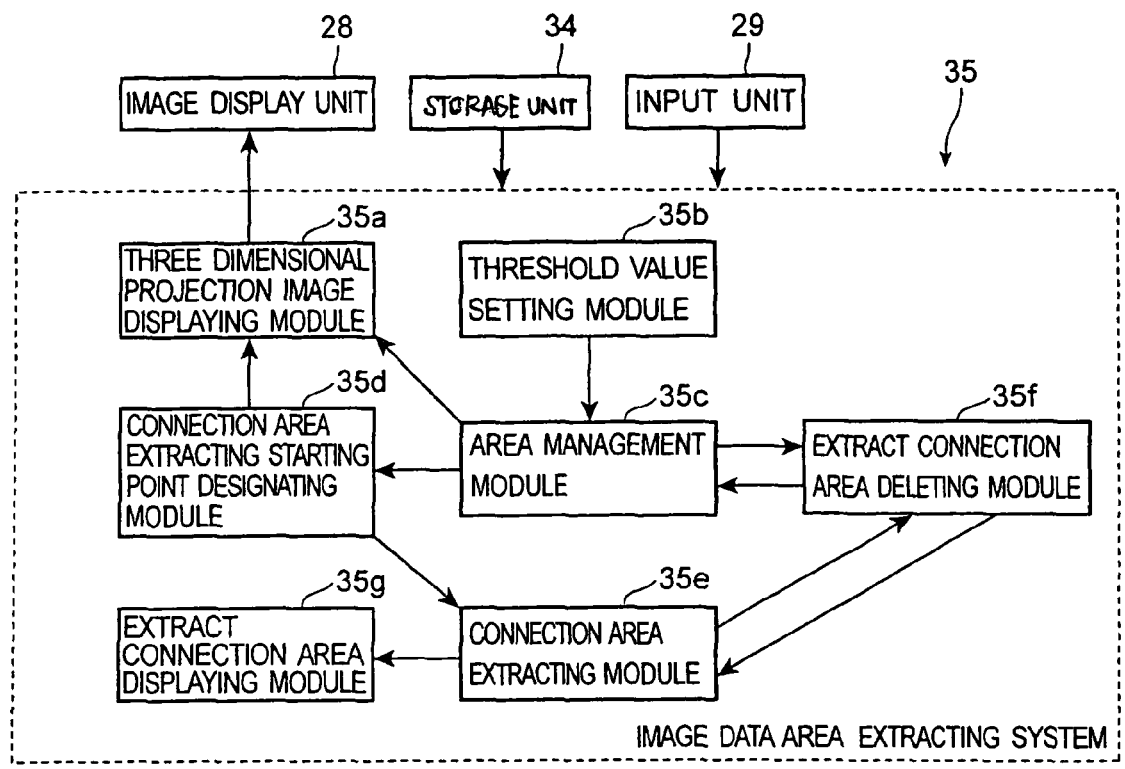
FIG. 3 is a block diagram illustrating the image data area extracting apparatus used in the system shown in the non-limiting example of FIG. 2.

FIG. 3 provides a detailed function block diagram of the image data area extracting system 35. As illustrated in the non-limiting example of FIG. 3, the image data area extracting system 35 uses the image data area extracting program and the computer apparatus 22. The image data extracting system 35 may be provided with three-dimensional projection image displaying module 35a, threshold value setting module 35b, area management module 35c, connection area extracting starting point designating module 35d, connection area extracting module 35e, extract connection area deleting module 35f, and extract connection area displaying module 35g. The image data area extracting system 35, however, may have a variety of other configurations and may be included with other elements of the present invention.

The three-dimensional projection image displaying module 35a may be configured to produce 3D image data by any projection method and may output and display the produced 3D image data at the image display unit 28. The three-dimensional projection image displaying module 35a may use the 3D image data included in the range of the existing area data received from the area management module 35c, as described below. With respect to the production of the 3D image data, it is possible to use projection methods such as MIP, MinIP, or arithmetical mean X-ray projection methods.

The three-dimensional projection image displaying module 35a may also be configured to produce and display the 3D image data by rotating, moving, and/or enlarging based upon command information received from the input unit 29, as the case may be. As a result, the three-dimensional projection image displayed at the display unit 28 may be turned, moved, or enlarged through the operation of the input unit 29.

Area management module 35c may be configured to acquire the threshold value area of the three-dimensional data to be used to extract data. The threshold value may be received from the threshold value setting module 35b. The area management module 35c may also be configured to output the acquired threshold value area for extracting data at the connected area extracting starting point designating module 35d.

The CT value may be used as the threshold value for acquiring the threshold value area extracting data. The pixel value (CT value) representing the changing point or range at which the degree of opacity changes from zero (transparency) to a value less than one (semi-transparency), and/or from zero to one (opacity), is set as the threshold value. Areas having pixel values above the threshold value or less than the threshold value may be acquired as threshold value area extracting data. The threshold value area acquired through the above steps may be regarded as 3D image data of a body or object.

Area management module 35c may be configured to set the latest area (existing area) of the 3D image data to be used for producing three-dimensional projection image data according to renewal data in the area received from the extract connection area deleting module 35f as the existing area data. The area management module 35c may also be configured to output the set existing area data at each of the three-dimensional projection image displaying module 35a, the connected area extracting starting point designating module 35d, and the extract connection area deleting module 35f. If the area management module 35c does not receive the renewal data of the existing area from the extract connection area deleting module 35f, the whole area of the 3D image data is regarded as the existing area.

The threshold value setting module 35b may also be configured to set the threshold value for acquiring the threshold value area extracting data based upon information received from the input unit 29. The area management module 35c may extract the threshold value area. The threshold value setting module 35b may also be configured to output the set threshold value at the area management module 35c.

The connected area extracting starting point designating module 35d may be configured to designate the starting point of the connected area to be deleted or displayed in the three-dimensional projection image, which is displayed at the image display unit 28. This starting point is based upon the threshold value area extracting data received from the operation data of the input unit 29. The connected area extracting starting point designating module 35d may also be configured to output the designated area starting point as the area extract starting point information, together with the threshold value area extracting data, at the connection area extracting module 35e.

For example, by operating a mask connected to the input unit 29, position information related to the 3D image displayed on the image display unit 28 may be provided to the connected area extracting starting point designating module 35d to designate the starting point of the connected area. Subsequently, the designating module 35d can designate the position at which the border face of the body, namely, a threshold value area detected as the starting point of the connected area by scanning the 3D image data. In other words, in order to detect the body and the 3D image data, the border face of the area (threshold value area) at which the opacity of the 3D image data exceeds a certain value can be regarded as the detecting point. The 3D image data included in the existing area may also be acquired from the existing area data received from the area management module 35c and from the 3D image data stored in the storage unit 34. The designated module 35d may provide information on the area extract starting point to the 3D projection image displaying module 35a, and may display the starting point on the image display unit 28.

The connection area extracting module 35e may be configured to acquire the body as the connected area data using conventional connection area extracting methods and to output the acquired connection area data to the extract connection area deleting module 35f and the extract connection area display module 35g. The connection area extracting module 35e may also be configured to reset the connected area data to an initial condition. In other words, the extracting module 35e may reset the connected area data such that the connected area does not exist after the reset. The extracting module 35e may also forward the connected area data to the extract connection area deleting module 35f and the extract connection area displaying module 35g.

The extract connection area deleting module 35f may be configured to produce the renewal data of the existing data of the 3D image data. This renewal data may be used to prepare the 3D image data based on command information for area deletion received from the input unit 29, as well as the existing area data received from the area management module 35c and the connected area data received from the area connection area extracting module 35e. The deleting module 35f may also be configured to output the produced renewal data of the existing data to the area management module 35c.

For example, the deleting module 35f may produce an area other than the connected area of the existing area as renewal data when the connected area data is set as the area to be deleted from the 3D image. However, if the connected area data is set as the area to be displayed as the 3D image, the connected area may simply be reproduced as the renewal data.

It is also possible that the connected area may be used for producing renewal data of in case of erosion of the connected area. It is also possible for the deleting module 35f to reset the connected area data to the initial condition by signaling the extracting module 35e with a resetting instruction. This may be performed when an instruction for deleting the area is received from the input unit 29.

The extract connection area displaying module 35g may also be configured to produce image data for displaying the connected area, according to the connected area data received from the connected area extracting module 35e. The extract connection area displaying module 35g may also output and display the produced image data of the connected area at the image display unit 28. For example, the connected area may be displayed in a 3D projection image.

Image data that is produced by the displaying module 35g may include image data displayed in a single color or multiple color projection image data with contrasting blood vessels. If discrimination of the connected area is possible, regardless of the type of projection image data, the image data produced by the displaying module 35g is acceptable.

Figure 4:
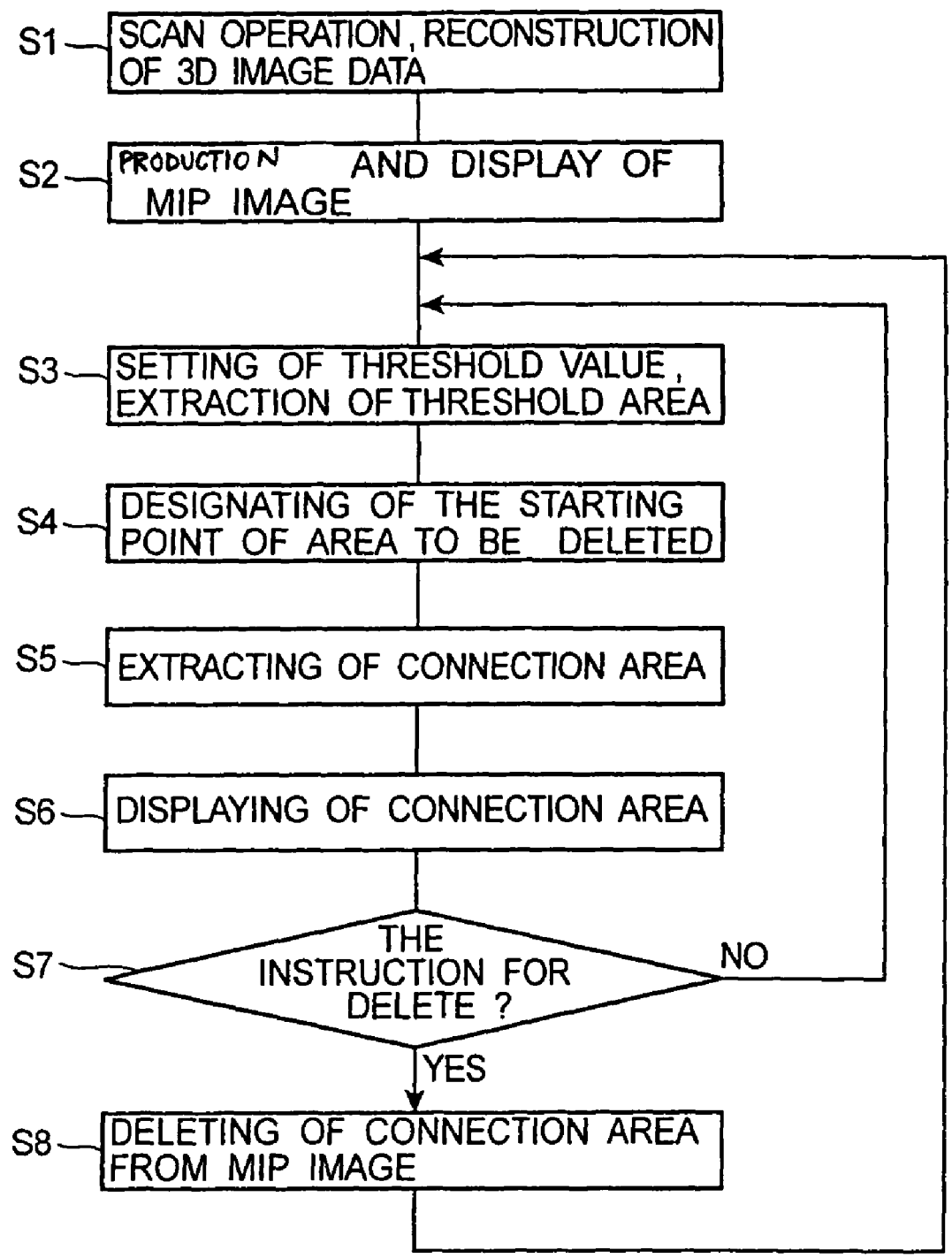
FIG. 4 provides a flowchart illustrating a process for constructing three-dimensional projection image data by extracting a particular area from X-ray CT image data and the image data area extracting apparatus according to a non-limiting aspect of the present invention.

FIG. 4 provides a non-limiting flowchart showing the process to produce 3D projection image data and the internal and external ranges of the extracted area. This image data is produced by extracting an area from the X-ray CT image data produced by the X-ray CT apparatus 20.

In step S1, for example, 3D image data of the object P is reconstructed, while scanning is executed by injecting a contrast medium into an object P. By injecting the contrast medium, it is possible to acquire the contrasted blood vessel images of the object P.

In other words, a tube current and a tube voltage are supplied from a high voltage generator 24 according to the control signal from computer apparatus 22 to X-ray tube 23 and an X-ray is irradiated to an object P. The X-rays transmitted through the object P are detected by the X-ray detector 25. The X-ray signal detected by the X-ray detector 25 is passed to data acquisition system 26, where the signal is digitized and outputted at computer apparatus 22 as raw data.

The raw data is converted into projection data by correction processing at pre-processing section 31. The corrected data is stored in the memory unit 32 of the computer apparatus 22. The image reconstruction section 33 reads the projection data from memory unit 32 and reconstructs the 3D image data. The image reconstruction section 33 stores the reconstructed 3D image data in the storage unit 34. The 3D image data including the contrasted blood vessels, which is stored in the storage unit 34, is used by the data extracting system 35 and is supplied for the production of 3D image data of the contrasted blood vessels.

In step S2, 3D projection image displaying module 35a reads the three-dimensional data from the storage unit 34. This 3D data includes contrasted blood vessels and bone areas. This read data is then displayed on image display unit 28.

In other words, all of the data is initially regarded as the existing area when preparing the 3D image data at the area management module 35c. For this reason, 3D projection image displaying module 35a requests all of the 3D image data, including contrasted blood vessels and bone areas, and prepares (for example) MIP image data using the MIP method. The produced MIP image data is then supplied to image display unit 28 and displayed there.

To remove the bone images from the MIP image, the bone deletion operation is commenced. This bone deletion operation may be performed by controlling input unit 29 with reference to the MIP image displayed on image display unit 28. However, it is also possible that, after a rough bone deletion operation is performed (for example, using an SVR image), a detailed bone deletion operation for removing bone areas with low CT values may be performed using image data area extracting system 35.

As another example, a user may begin with the bone deletion operation by selecting a CT value range that correctly extracts an MIP image of the contrasted blood vessel by observing the MIP image including the contrasted blood vessels and bone areas.

Figure 5A:
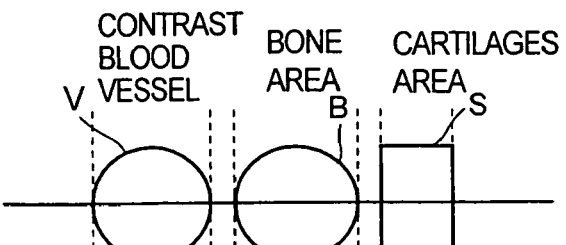
FIGS. 5(a)-5(g) illustrate a non-limiting example of a bone area image data deleting operation using the image data area extracting apparatus according to a non-limiting aspect of the present invention.
Figure 5B:
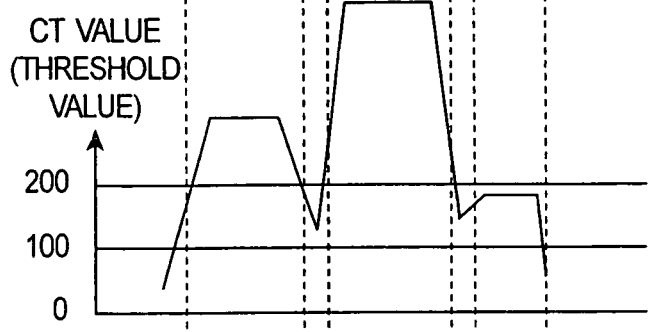

FIGS. 5a-5g illustrate an example of the steps involved in the bone deletion operations according to the image area extracting system of the present invention. As illustrated in FIG. 5a, if contrasted blood vessel V, bone area B, and cartilage area S are located nearby, the profile image of the CT value at the position indicated by a solid line is shown in FIG. 5b. More specifically, the CT value for contrasted blood vessel V and bone area B exceeds 200, and the CT value for cartilage area S is between 100 and 200. The CT value for the space between contrasted blood vessel V and bone area B, as well as for the space between bone area B and cartilage area S, becomes smaller than the CT values for the contrasted blood vessel V, bone area B, and cartilage area S.

By utilizing such CT value differences, discrimination and separation of contrasted blood vessel V, bone area B, and cartilage area S may be performed. The MIP image is displayed by allocating CT values to respective gray levels. For this reason, the portions having small CT values display as black, while the portions having high CT values display as white.

In the case of MinIP images, threshold values are generally processed before the MinIP process. As a result, the CT value of the 3D image data may be in the range of −900 to 500, because the value of MinIP becomes −1000 if air having a value of −1000 exists around the body of the object P.

Figure 5C:
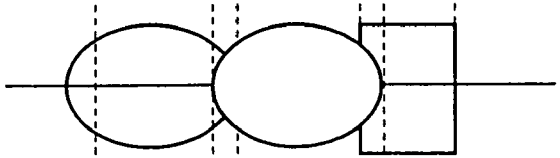
Figure 5D:
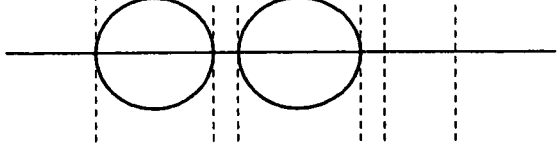

At step S3, the CT value is set as the threshold value, so that blood vessel V, bone area B, and cartilage area S are extracted as threshold value areas and separated into respective portions. If the CT value is set too low as the threshold value, contrasted blood vessel V and bone area B cannot be properly separated. In other words, in the case of an MIP image having a profile image CT value shown in FIG. 5(b), the CT value between contrasted blood vessel V and bone area B, as well as the CT value between bone area B and cartilage area S may exceed 100. Thus, if the threshold value is made smaller than 100, for example, which is smaller than a CT value of the cartilage area S, and an area having a CT value exceeding 100 is regarded as the threshold value area, then contrasted blood vessel V, bone area B, and cartilage area S are joined together as shown in FIG. 5(c).

To separate contrasted blood vessels V and bone area B when the bone deletion operation is started, a larger CT value is set as the threshold value. For example, a user may set a CT value of 200, which is larger than the CT value between contrasted blood vessels V and bone area B, as well as the CT value between the bone area B and the cartilage area S. This value may be set using input unit 29. The threshold values setting module 35b receives an instruction to set the threshold value at 200 from input unit 29. The CT value is then outputted to area management module 35c as the threshold.

By referring to the 3D image data stored in storage unit 34, the area management module 35c acquires the threshold value area, which has a CT value greater than 200. This area represents the threshold value area extracting data. As a result, for an MIP image with a profile image of CT value as shown in FIG. 5(b), contrasted blood vessels V and bone area B, both of which have CT values larger than 200, are separated and regarded as the threshold value area shown in FIG. 5(d). Each threshold value area is inputted into connected area extracting starting point designating module 35d as the threshold value area data.

At step S4, a user may designate bone area B, which is separated, as the threshold value area using input unit 29. The user may then supply an instruction for the deletion of bone area B from the MIP image. In other words, the starting point of the area to be deleted may be specified using input unit 29.

Figures 6A, 6B:
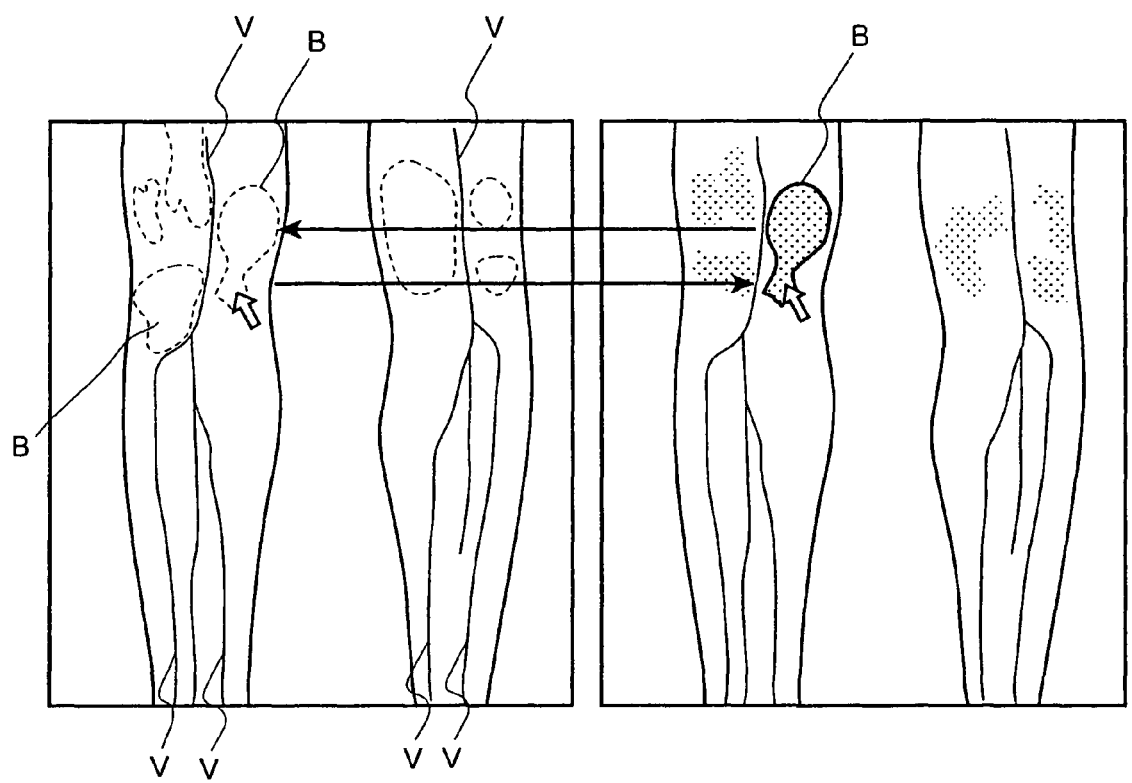
FIGS. 6(a)-6(b) illustrate a non-limiting example of a method for designating a particular area to be deleted in the MIP image using the image data area extracting system of the present invention.

FIGS. 6(a)-6(b) illustrate a method to designate an area to be deleted in an MIP image using image data area extracting system 35. FIG. 6(a) illustrates an example of an MIP image including the object P for bone deletion operation. Bone area B is illustrated by dotted lines. Contrasted blood vessels B are also displayed. In FIG. 6(a), the CT value of the bone area B is low. In this example, bone area B may be extracted and deleted in advance, before the deletion of cartilage area S is performed.

As indicated by the wide arrow in FIG. 6(a), any point in bone area B may be selected by using the mouse on the MIP image. When any point in bone area B is selected in the MIP image (e.g., by clicking with a mouse), position data may be provided to the connected area extracting starting point designating module 35d as the data which designates the starting point of the area to be deleted from the MIP image. In other words, the designating module 35d detects an organ in bone area B, which is set as the threshold value area, by scanning by the MIP image in the direction desired, and specifies the detected position of an organ as the starting point of the area to be deleted.

FIG. 6(b) illustrates an example of 3D image data included in the existing area. While FIG. 6(b) illustrates a model of the three-dimensional data, this data may not be the same as data displayed at image display unit 28. In the 3D image data illustrated in FIG. 6(b), scanning is performed on the position corresponding to the position clicked on the MIP image in a direction specified by the user, and the detected position of bone area B is the starting point of the area to be deleted. Designating module 35d inputs the starting point of the area to be deleted, which is the detected position of bone area B, together with the threshold value extracting data into connection area extracting module 35e.

Next, at step S5, connection area extracting module 35e acquires the threshold value area connected to the starting point of the area to be deleted. Namely, bone area B is acquired as the connected area data using a common connected area extracting method. The connection area extracting module 35e inputs the connected area data representing the acquired bone area B into extract connection area deleting module 35f and extract connection area displaying module 35g.

In step S6, extract connection area displaying module 35g produces MIP image data, which may be displayed in color by allocating a color to bone area B. This color may be any color desired by the user, and may be selected using a mouse. Adding color enables the user to easily discriminate the bone area B, according to the connected area data received from connection area extracting module 35e. Extract connection area displaying module 35g may also supply MIP image data of bone area B prepared in color at image display unit 28.

Figure 7:
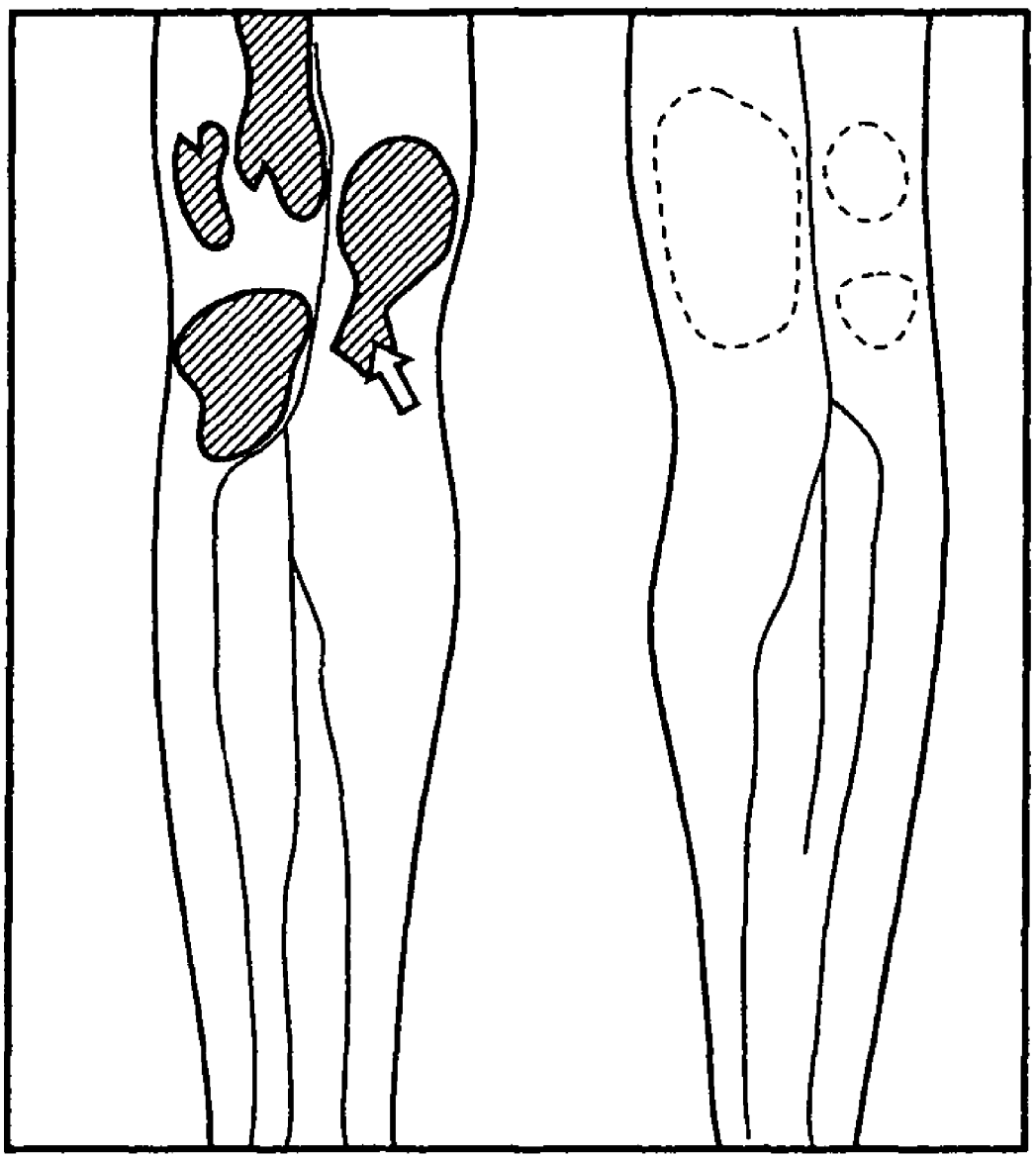
FIG. 7 depicts an example showing MIP images that are displayed at the image displaying section using the image data extracting system, according to a non-limiting example of the present invention.

FIG. 7 illustrates an example of an MIP image of bone area B in color, which is displayed at image display unit 28. As shown in FIG. 7, the bone area B (portion illustrated by an arrow) as selected by a user is displayed in the MIP image in color. Thus, it is easy for a user to determine whether or not the selected area is the proper area to be deleted from the MIP image. Once the user has determined that the selected bone area B is the proper area to be deleted, the user may use input unit 29 to input a deletion instruction to the extracting system 35.

At step S7, the instruction to delete bone area B inputted into image data area extracting system 35 is passed to extract connection area deleting module 35f. The deleting module 35f then recognizes that it received a command for deletion of bone area B from input unit 29. Thus, at step S8, the image of the selected bone area B is deleted from the MIP image by the extracting system 35.

It is also possible for the deleting module 35f to supply a reset instruction to extracting module 35e. This reset instruction may correspond to the command to delete bone area B received from input unit 29. The extracting module 35e resets the connected area data to the initial condition when the reset command is received. If the connected area does not exist after the resetting, connection area extracting module 35e inputs connected area data into the deleting module 35f and extract connection area displaying module 35g.

Upon receipt of connected area data in the initial condition from the extracting module 35e, displaying module 35g stops the supply of the MIP image data in color to image unit 28. Through this procedure, a color MIP image is displayed to more clearly illustrate cartilage area S.

In parallel with obtaining the MIP image in color, the deleting module 35f produces an area other than the connected area corresponding to bone area B as renewal data of the existing area. This renewal data is based on the existing area data received from area management module 35c and the connected area data before the reset. The existing area data may be received from the extracting module 35e. As a result, the connected area may be dilated and/or eroded (e.g., expanded or contracted). This dilated and/or eroded area may be used for production of renewal data of the existing area.

Extract connection area deleting module 35f may output the renewal data to area management module 35c. Management module 35c renews the existing area of the 3D image data used for production of MIP image data as a new existing area, which is acquired by deleting bone area B from the existing area. Furthermore, area management module 35c supplies the renewed existing area as the existing area data to the 3D projection image displaying module 35a, designating module 35d, and deleting module 35f.

Consequently, three-dimensional projection image displaying module 35a reproduces MIP image data from the 3D image data included in the area from which bone area B is deleted. This image data, which is the renewed existing area, is reproduced as original data. The displaying module 35a supplies the renewed MIP image data to image display unit 28. As a result, the MIP image from which image of bone area B is deleted is displayed at display unit 28. This process may be repeated iteratively for a plurality of areas to be selected using similar procedures for deletion from the MIP image.

However, if a user determines that the setting of the threshold value is not correct, the user may choose not to input an instruction to delete bone area B. For this reason, a threshold value for extracting the MIP image of the blood vessel area from the MIP image may be set again at step S3, without determining that extract connection area deleting module 35f has received an instruction to delete anything from input unit 29 at step S7.

For example, when the threshold value is determined to have been set improperly, as in the case that bone area B and contrasted blood vessel V cannot be separated, the threshold value may be increased to CT value 250. By selecting the threshold value area specified by the newly threshold value, a bone deletion operation may be started using the procedures described above.

Additionally, when it is determined than an organ, having a low CT value and that is unnecessary for clinical diagnosis still appears in the image, a threshold value may be again set smaller at step S3. The deletion operation may be iteratively performed by lowering the CT value until the MIP image data is obtained that does not include unnecessary organ images.

For example, for MIP image including a profile image with a CT value shown in FIG. 5(b), it is preferred to delete for the cartilage area S with CT value less than 200, even though bone area B is deleted using CT value 200 as the threshold value. It is then preferred that the cartilage area S is included in the threshold value area by lowering the threshold value to CT value 100.

Figure 5E:
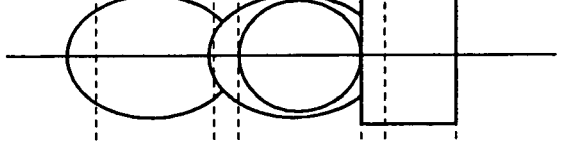

However, the tissue around bone area B having a CT value near 200 may remain without being deleted. For this reason, contrasted blood vessel B and cartilage area S may be joined together, as shown in FIG. 5(e) when the threshold value is lowered from CT value 200 to CT value 100.

Figure 5F:
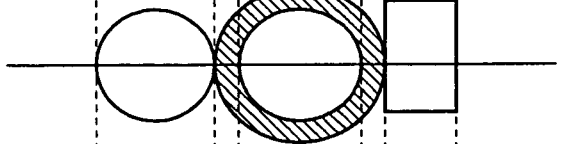
Figure 5G:
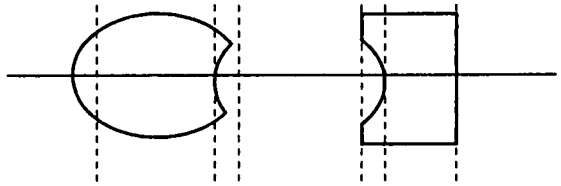

As shown by hatching in FIG. 5(f), bone area B selected as the connected area may be deleted after dilation by extract connection area deleting module 35f. Other areas which include bone area B after dilation may become renewed existing areas. For this reason, as shown in FIG. 5(g), even when the threshold value is lowered to CT value 100 at step S3 to delete cartilage S from the MIP image, contrasted blood vessel B and cartilage area S may be separated.

Similarly, cartilage area S may be selected as the connected area and may be deleted from the MIP image. In other words, the connected area may be extracted by selecting cartilage area S. Dilation of the connected area and deletion of the connection area after dilation may be performed repeatedly, while the threshold value is gradually reset at a lower value. As a result, an MIP image including contrasted blood vessels and from which unnecessary image data (e.g., bone and cartilage images) is deleted may be produced.

In other words, the X-ray CT apparatus 20 as described above is an apparatus which is configured to extract a specified area using a connected area extracting method according to a standard value, such as a CT value, in a 3D image. Accordingly, it is possible to specify images such as internal organs or bones and extract these images directly. In other words, a bone deletion operation may be performed on the 3D image without preparing 3D image data such as SVR image data to delete the bone images.

In this way, the complicated procedures previously used to develop an acceptable image for diagnosis (such as adjustment of threshold values of the image to be volume displayed, selection of an organ to be deleted, and verification operations using 3D images) may be eliminated. At the very least, the number of these repeated operations may be reduced by using both the bone deletion operations of the value displayed image and the bone deletion operation of the three-dimensional imaging in combination. Clinically effective diagnosis images may then be produced more effectively using 3D projection images. It is also possible to eliminate some of the elements in the functions of the X-ray CT apparatus and image data area extracting system.

It is important to note that while an X-ray CT apparatus has been used as a non-limiting example in the above description, image data area extracting system 35 may also be used to prepare 3D projection image data, not only from X-ray CT apparatus 20, but also from the 3D image data obtained by other clinical diagnosis apparatus.

As explained above, according to the non-limiting embodiments of the present invention, it is easy to search evacuated images and the evacuated images may be used as reference images for diagnosis by sorting images of a higher priority order. While all the images constructed in each MPR image display area may not be displayed in one display area, at least one evacuated area among the plurality of image displaying areas may be provided so that images having higher priority orders may be displayed in one display area, and images of lower priority orders may be displayed in the evacuated area by reducing their respective image sizes.

Obviously, numerous modifications and variations of the present invention are possible in light of the above teachings. It is therefore to be understood that within the scope of the appended claims, the invention may be practiced otherwise than as specifically described herein.

The invention claimed is:

1. An image data area extracting system, comprising:
a threshold value setting unit configured to set a threshold value for three dimensional image data of an object, the three dimensional image data being derived from an image diagnosis apparatus;
an input unit configured to receive an inputted threshold value from a user as the set threshold value;
an area managing unit configured to set an existing area of the three dimensional image data and to extract a threshold value area of the three dimensional image data in the existing area based on the threshold value;
a three dimensional projection image display unit configured to display a three dimensional projection image by providing three dimensional projection image data to an image display unit, the three dimensional projection image data being constructed from the three dimensional image data included in the existing area, the three dimensional projection image display unit being configured to display the threshold value area;
a starting point designating unit configured to designate a starting point for a connected area to be deleted from the three dimensional projection image displayed on the image display unit or a starting point for a connected area being displayed on the image display unit, wherein the input unit is configured to receive an input of the starting point from a user operation on the displayed threshold value area;
a connected area extraction unit configured to acquire the threshold value area that connects to the designated starting point as the connected area; and
an extracted connected area deleting unit configured to renew the existing area by deleting the connected area,
wherein the input unit is configured to receive an additional input from the user for changing the threshold value after the connected area is deleted.

2. The image data area extracting system according to claim 1, wherein the connected area extraction unit is configured to expand or to contract the connected area.

3. The image data area extracting system according to claim 1, further comprising an extracted connected area display unit configured to display the connected area by providing image data to the image display unit so that the connected area is displayed on the three dimensional projection image.

4. The image data area extracting system according to claim 1, wherein the image diagnosis apparatus includes an X-ray CT apparatus, and the CT apparatus includes,
an acquired data collecting unit configured to collect data related to an object, and
an image reconstructing unit configured to reconstruct the three dimensional image data from the collected data.

5. An image data area extracting method implemented on an image data area extracting system, comprising:
receiving an inputted threshold value from a user;
setting, at the image data area extracting system, the inputted threshold value as a threshold value for three dimensional image data of an object, the three dimensional image data being derived from an image diagnosis apparatus;
setting, at the image data area extracting system, an existing area of the three dimensional image data and extracting a threshold value area of the three dimensional image data in the existing area, based at least in part on the threshold value;
constructing, at the image data area extracting system, a three dimensional projection image from the three dimensional image data included in the existing area;
displaying the three dimensional projection image and the threshold value area on an image display unit;
designating, at the image data area extracting system, a starting point for a connected area to be deleted from the displayed three dimensional projection image or a starting point for a connected area to be displayed, based on an input of the starting point from a user operation on the displayed threshold value area;
renewing, at the image data area extracting system, the existing area to delete the connected area; and
receiving an additional input from the user for changing the threshold value after the connected area is deleted.

6. The image data area extracting method according to claim 5, further comprising:
displaying the connected area by providing connected area image data to an image display unit so that the connected area is displayed on the three dimensional projection image.

7. An X-ray CT apparatus comprising:
a data collecting unit configured to collect raw data of an object;
an image reconstructing unit configured to reconstruct three dimensional image data from the collected raw data;
a threshold value setting unit configured to set a threshold value of the three dimensional image data;
an input unit configured to receive an inputted threshold value from a user as the set threshold value;
an area managing unit configured to manage an existing area of the three dimensional image data and to extract the threshold value area of the three dimensional image data at the existing area based at least in part on the threshold value;
a three dimensional projection image displaying unit configured to display three dimensional projection image data from the three dimensional image data included in the existing area, and to display the threshold value area;
an area extraction starting point designating unit configured to designate a starting point of a connected area to be deleted from the three dimensional projection image data according to an inputted location data designated by a user operation on the displayed threshold value area;
a connected area extracting unit configured to extract the threshold value area connected to the starting point designated as the connected area; and
an extract connection area deleting unit configured to delete the connected area and to input renewal data to the area managing unit, the renewal data including the existing area data without a connected area data,
wherein the input unit is configured to receive an additional input from the user for changing the threshold value after the connected area is deleted.

8. The X-ray CT apparatus according to claim 7, wherein the extract connection area deleting unit is configured to output reset data of the connected area to the connected area extracting unit area in accordance with a deleting command from the input unit.

9. The X-ray CT apparatus according to claim 8, wherein the connected area extracting unit is configured to output second connected area data based on the reset data, and the second connected area data does not include the connected area data.

10. The X-ray CT apparatus according to claim 7, wherein the area managing unit renews data of areas other than the connected area data as new existing area data upon receipt of the renewal data.

11. The X-ray CT apparatus according to claim 7, wherein the connected area extracting unit is configured to perform at least one of expanding and contracting the connected area.

12. The X-ray CT apparatus according to according to claim 7, further comprising an extract connection area displaying unit configured to display the connected area on the three dimensional projection image in at least one color.

13. An image data area extracting system, comprising:
   a threshold value setting unit configured to set a threshold value for three dimensional image data of an object;
   an input unit configured to receive an inputted threshold value from a user as the set threshold value;
   an area managing unit configured to extract a threshold value area from the three dimensional image data based at least in part on the threshold value;
   a three dimensional projection image display unit configured to display an image, the image being constructed from the three dimensional image data, and to display the threshold value area;
   a starting point designating unit configured to designate a starting point for a connected area to be deleted from the image, wherein the input unit is configured to receive an input of the starting point from a user operation on the displayed threshold value area; and
   an extract connected area deleting unit configured to remove the connected area from the image based at least in part on the threshold value,
   wherein the input unit is configured to receive an additional input from the user for changing the threshold value after the connected area is deleted.

14. The image data area extracting system according to claim 13, further comprising a connected area extraction unit configured to perform at least one of expanding and contracting the connected area.

15. The image data area extracting system according to claim 13, further comprising an extracted connected area display unit configured to display the connected area.

16. The image data area extracting system according to claim 13, wherein the three dimensional image data is based on data obtained from an X-ray CT apparatus, the X-ray CT apparatus including,
   an acquired data collecting unit configured to collect data related to an object, and
   an image reconstructing unit configured to reconstruct the three dimensional image data based on the collected data.

17. An image data area extracting method, implemented on an image data area extracting system, comprising:
   receiving an inputted threshold value from a user;
   setting, at the image data area extracting system, the inputted threshold value as at least one threshold value for three dimensional image data of an object;
   isolating, at the image data area extracting system, at least one existing area in the three dimensional image data;
   extracting, at the image data area extracting system, at least one threshold value area from the existing area based at least in part on the at least one threshold value;
   constructing, at the image data area extracting system, a three dimensional projection image from the three dimensional image data;
   displaying the three dimensional projection image and the threshold area on an image display unit;
   deleting, at the image data area extracting system, at least one connected area adjacent to the threshold value existing area; and
   receiving an additional input from the user for changing the threshold value after the connected area is deleted.

18. The image data area extracting method according to claim 17, further comprising:
   displaying a new three dimensional projection image after the deleting step.

19. An X-ray CT apparatus comprising:
   a data collecting unit configured to collect raw data related to an object;
   an image reconstructing unit configured to reconstruct three dimensional image data from the raw data;
   a threshold value setting unit configured to set a threshold value for the three dimensional image data;
   an input unit configured to receive an inputted threshold value from a user as the set threshold value;
   an area managing unit configured to determine a threshold value area of the three dimensional data based on the threshold and to extract the threshold value area, thereby generating remaining three dimensional data;
   a display unit configured to display projection image data generated using the remaining three dimensional data, and to display the threshold value area;
   a connected area extraction unit configured to extract a connected area connected to the threshold value area; and
   a deleting unit configured to delete the connected area,
   wherein the display unit is further configured to display projection image data using data remaining after the connected area is deleted,
   wherein the input unit is configured to receive an additional input from the user for changing the threshold value after the connected area is deleted.

20. The X-ray CT apparatus according to claim 19, further comprising:
   a renewal data generating unit configured to input renewal data to the area managing unit.

21. The X-ray CT apparatus according to claim 20, wherein the renewal data excludes data of the connected area.

22. The X-ray CT apparatus according to claim 19, wherein the deleting unit is configured to output reset data related to the connected area.

23. The X-ray CT apparatus according to claim 19, wherein the connected area extracting unit is configured to perform at least one of expanding and contracting the connected area.

* * * * *